US010214244B2

(12) United States Patent
Kamei et al.

(10) Patent No.: US 10,214,244 B2
(45) Date of Patent: Feb. 26, 2019

(54) FRAME STRUCTURE FOR VEHICLE

(71) Applicant: MAZDA MOTOR CORPORATION, Hiroshima (JP)

(72) Inventors: Takehiro Kamei, Hiroshima (JP); Masanobu Hanazaki, Hiroshima (JP); Chikara Kawamura, Hiroshima (JP); Masaki Motoki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/658,913

(22) Filed: Jul. 25, 2017

(65) Prior Publication Data

US 2018/0072347 A1    Mar. 15, 2018

(30) Foreign Application Priority Data

Sep. 13, 2016   (JP) .................................. 2016-178225

(51) Int. Cl.
| | |
|---|---|
| *B62D 29/00* | (2006.01) |
| *B62D 21/15* | (2006.01) |
| *B60R 19/34* | (2006.01) |
| *B62D 25/08* | (2006.01) |
| *B62D 27/02* | (2006.01) |

(52) U.S. Cl.
CPC ............ *B62D 21/152* (2013.01); *B60R 19/34* (2013.01); *B62D 25/08* (2013.01); *B62D 25/082* (2013.01); *B62D 27/02* (2013.01); *B62D 29/007* (2013.01)

(58) Field of Classification Search
CPC .......... B62D 21/15; B62D 25/08; B60R 19/34
USPC ..................... 296/187.09, 193.09, 204, 96.21
See application file for complete search history.

(56) References Cited

U.S. PATENT DOCUMENTS

| | | | | |
|---|---|---|---|---|
| 4,909,565 A | * | 3/1990 | Harasaki ............... | B62D 21/152 296/187.09 |
| 8,002,337 B2 | * | 8/2011 | Baccouche ............ | B62D 25/04 296/187.09 |
| 8,905,466 B2 | * | 12/2014 | Iseki ...................... | B62D 21/11 296/203.02 |
| 8,967,671 B2 | * | 3/2015 | Kim ...................... | B62D 25/082 280/785 |
| 9,266,563 B1 | * | 2/2016 | Han ....................... | B62D 21/11 |

FOREIGN PATENT DOCUMENTS

JP    2016-113084 A    6/2016

* cited by examiner

*Primary Examiner* — D Glenn Dayoan
*Assistant Examiner* — Sunsurraye Westbrook
(74) *Attorney, Agent, or Firm* — Studebaker & Brackett PC

(57) ABSTRACT

There are provided an outer panel, an inner panel, a second reinforcement provided in the main closed-cross section and cooperates with the outer panel to form a sub closed-cross section extending longitudinally, a bead portion formed at a portion of the inner panel which is located at a position corresponding to the second reinforcement, and configured to be a starting point causing bending of a front side frame toward the second reinforcement when a collision load is applied in a vehicle collision, and a second attaching member provided at a position located on a front-end side of the front side frame relatively to the second reinforcement and configured to make the second reinforcement crushable in a bending direction in the vehicle collision. The second attaching member comprises a knot-shaped member provided inside the main closed-cross section.

5 Claims, 8 Drawing Sheets

FRAME STRUCTURE FOR VEHICLE

BACKGROUND OF THE INVENTION

The present invention relates to a frame structure for a vehicle comprising a reinforcing member which is provided in a main closed-cross section and cooperates with one of an outer panel and an inner panel to form a sub closed-cross section extending in a longitudinal direction.

Conventionally, a structure in which a crash can (a crash box) configured to be axially-compressively deformable is provided at a tip portion of a high-tensile steel-plate made front side frame and plural impact-absorbing mechanisms configured to be bendable initiatively are provided over a range from a midway portion of the front side frame to a rear end portion of the front side frame has been used to increase the impact energy absorption in a vehicle frontal collision, thereby achieving passenger's protection. In such impact-absorbing mechanisms, since an impact load absorbed through bending deformation of the front side frame shares most of the energy absorption after the axially-compressive deformation of the crash can, energy absorption characteristics through the bending deformation affects the EA (Energy Absorption) performance more than energy absorption characteristics through the compressive deformation.

In a frame structure disclosed in Japanese Patent Laid-Open publication No. 2016-113084, a first reinforcing member which cooperates with a main closed cross section to form five sub closed cross sections which are vertically adjacent to each other comprises a first partition wall portion including a first compression-side partition portion and a first tension-side partition portion and a second partition wall portion including a second compression-side partition portion and a second tension-side partition portion, a vertical distance between tension-side ridgeline portions facing each other is set to be smaller than a vertical distance between compression-side ridgeline portions facing each other, and when a difference between a lateral width of the first and second compression-side partition portions and a lateral width of the first and second tension-side partition portions at a front end portion of a front-side area is set to be smaller than a difference between a lateral width of the first and second compression-side partition portions and a lateral width of the first and second tension-side partition portions at a rear-half portion of the front-side area in a case where a load is inputted. Thereby, the tension-side ridgeline portions facing each other contact early after buckling of the frame happens, so that the respective partition wall portions cooperate with each other to constitute a truss structure on a tension side, thereby suppressing a sectional collapse caused by the bending deformation.

The frame structure of the above-described patent document can increase an allowable-limit load up to the plastic zone (area) of a material, so that the EA efficiency in the bending deformation of the frame properly increases. However, while the above-described frame structure of the patent document increases the EA efficiency due to the bending strength that the reinforcing member has, the axially-compressive deformation is not considered at all in this frame structure, so that the compressive strength that the reinforcing member has may not sufficiently contribute to the increase of the EA efficiency in the bending deformation of the frame. That is, if the impact load was absorbed by using the compressive strength of the reinforcing member in addition to the bending strength, the EA efficiency could be further increased and therefore the load absorption could be increased properly.

SUMMARY OF THE INVENTION

An object of the present invention is to provide a frame structure for a vehicle which can properly increase the load absorption in the vehicle collision by using the bending strength and the compressive strength of the reinforcing member.

The present invention is a frame structure for a vehicle, comprising an outer panel forming an outward wall portion, in a vehicle width direction, of a frame, an inner panel forming an inward wall portion, in the vehicle width direction, of the frame and cooperating with the outer panel to form a main closed cross section extending in a longitudinal direction, a reinforcing member provided in the main closed-cross section and cooperating with one of the outer panel and the inner panel to form a sub closed-cross section extending in the longitudinal direction, a bending promotion portion formed at a portion of the other one of the outer panel and the inner panel which is located at a position corresponding to the reinforcing member, the bending promotion portion being configured to be a starting point which causes bending of the frame toward the reinforcing member when a collision load is applied to the frame in a vehicle collision, and a crushing mechanism provided at a position located on a front-end side of the frame relatively to the reinforcing member and configured to make the reinforcing member crushable in a bending direction in the vehicle collision.

According to the present frame structure for the vehicle, since there is provided the bending promotion portion which is formed at the portion of the other one of the outer panel and the inner panel which is located at the position corresponding to the reinforcing member and configured to be the starting point which causes the bending of the frame toward the reinforcing member when the collision load is applied to the frame in the vehicle collision, the reinforcing member can be made to have the bending deformation at the previously-set starting point by the impact load. Further, since there is provided the crushing mechanism which is provided at the position located on the front-end side of the frame relatively to the reinforcing member and configured to make the reinforcing member crushable in the bending direction in the vehicle collision, the impact load can be absorbed by using the compressive strength of the reinforcing member.

In an embodiment of the present invention, the crushing mechanism comprises a knot-shaped member provided in the main closed-cross section.

According to this structure, the reinforcing member can be crushed in the bending direction by the knot-shaped member which is an existing rigidity member.

In another embodiment of the present invention, the knot-shaped member is configured to have a roughly U-shaped cross section, in a plan view, which opens toward the other one of the outer panel and the inner panel, and joined to the other one of the outer panel and the inner panel at front and rear ends thereof.

According to this structure, since a closed cross section is formed in the plan view by the knot-shaped (U-shaped) member and the other one of the outer panel and the inner panel, crushing can be further promoted through the closed cross section's contacting the reinforcing member in the vehicle collision.

In another embodiment of the present invention, the knot-shaped member comprises a tube member for auxiliary-device attachment which is provided to extend in a vertical direction inside the roughly U-shaped cross section of the knot-shaped member.

According to this structure, it can be properly suppressed that the closed cross section is crushed by the tube member provided inside during the above-described crushing through the closed cross section's contacting the reinforcing member in the vehicle collision.

In another embodiment of the present invention, the inner panel is configured to have a hat-shaped cross section, in a front view, which comprises a side wall portion, an upper wall portion, a lower wall portion, and a pair of upper-and-lower flange portions extending vertically from respective side ends of the upper and lower wall portions and joined to a pair of upper-and-lower flange portions formed at the outer panel at the pair of upper-and-lower flange portions thereof, respectively, and the knot-shaped member of the crushing mechanism is joined to the side wall portion, the upper wall portion, and the lower wall portion of the inner panel and comprises a pair of upper-and-lower flange portions which are provided to extend upward and downward from upper and lower ends thereof, which are interposed between and joined to the respective upper-and-lower flange portions of the outer and inner panels, thereby forming three-layer joint portions at each of the respective pair of upper-and-lower flange portions of the outer panel, the inner panel, and the knot-shaped member.

According to this structure, it can be properly suppressed that the above-described one of the outer panel and the inner panel is deformed forward relatively to the other one of the outer panel and the inner panel because the crushing mechanism is not strong enough compared to the yield strength, in a crushing direction, of the reinforcing member when the crushing of the reinforcing member progresses through the crushing mechanism's contacting the reinforcing member in the vehicle collision.

In another embodiment of the present invention, the crushing mechanism is joined to the other one of the outer panel and the inner panel.

According to this structure, the crushing mechanism can be deformed in the bending direction by using deformation of the other one of the outer panel and the inner panel.

In another embodiment of the present invention, the reinforcing member is spaced apart from the other one of the outer panel and the inner panel.

According to this structure, previously-set bending deformation can be started for the other one of the outer panel and the inner panel by the impact load, so that the reinforcing member can be made to have bending deformation with time lags.

In another embodiment of the present invention, the crushing mechanism comprises a tube member for auxiliary-device attachment.

According to this structure, the reinforcing member can be surely crushed in the bending direction by the tube member which is the existing rigidity member.

Other features, aspects, and advantages of the present invention will become apparent from the following description which refers to the accompanying drawings.

DETAILED DESCRIPTION OF THE INVENTION

Figure 1:
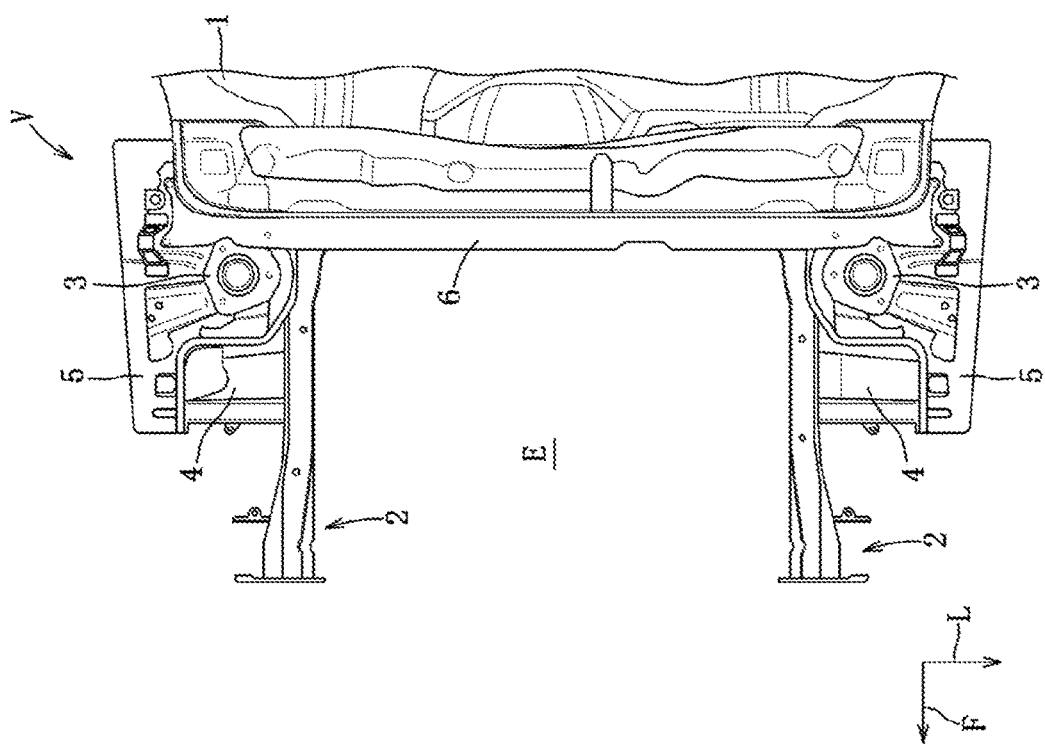
FIG. 1 is a plan view of a vehicle-body front portion according to an embodiment.

Hereafter, embodiments of the present invention will be described specifically referring to the drawings. The following description shows examples where the present invention is applied to a front side frame of a vehicle, which does not limit the present invention, its applications, or its uses. In the figures, an arrow F shows a forward direction, an arrow L shows a leftward direction, and an arrow U shows an upward direction.

Figure 2:
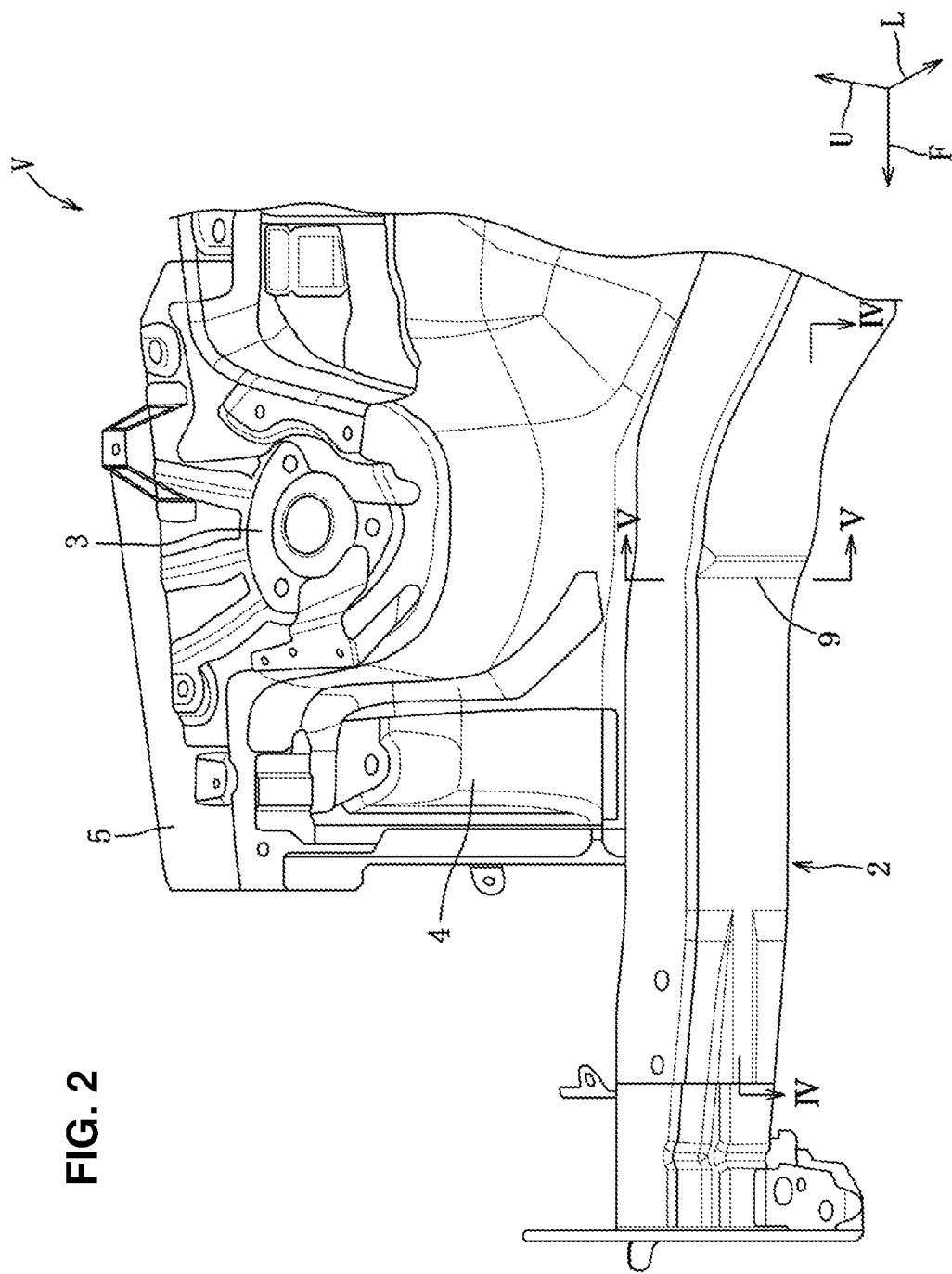
FIG. 2 is a side view of a right-side front side frame, when viewed from an upper inside of an engine room.

Hereafter, an embodiment of the present invention will be described referring to FIGS. 1-8. A front vehicle-body structure in which a front side frame is provided will be described briefly first. As shown in FIGS. 1 and 2, a vehicle V comprises a dash panel 1 which extends vertically and laterally to partition a cabin from an engine room E, a pair of right-and-left front side frames 2 (frames for the vehicle) which respectively extend longitudinally in front of the dash panel 1, a pair of right-and-left suspension towers 3 which are respectively provided to rise in a tower shape at respective outward positions, in a vehicle width direction, of the pair of front side frames 2, a pair of right-and-left apron portions 4 which respectively extend vertically and longitudinally and interconnect the pair of suspension towers 3 and the dash panel 1, a pair of right-and-left apron reinforcement members 5 which respectively extend longitudinally from respective upper ends of the pair of apron portions 4, a gutter-shaped cowl unit 6 which interconnects respective rear-side upper end portions of the pair of suspension tower portions 3, and others. Herein, since this front vehicle-body structure is symmetrical laterally, a left-side vehicle-body structure will be described mainly.

The front side frame 2 will be described specifically. At a front end portion of the front side frame 2 is provided, via a set plate, a crash can (not illustrated) which has compressive deformation (axially-compressive deformation) to absorb part of collision energy when receiving an impact load from its front face. Further, various auxiliary devices including a roughly-columnar engine mount device (not illustrated) are supported at a midway portion of the front side frame 2, and a suspension sub frame (not illustrated) is supported at a rear-end side portion of the front side frame 2.

Figure 3:
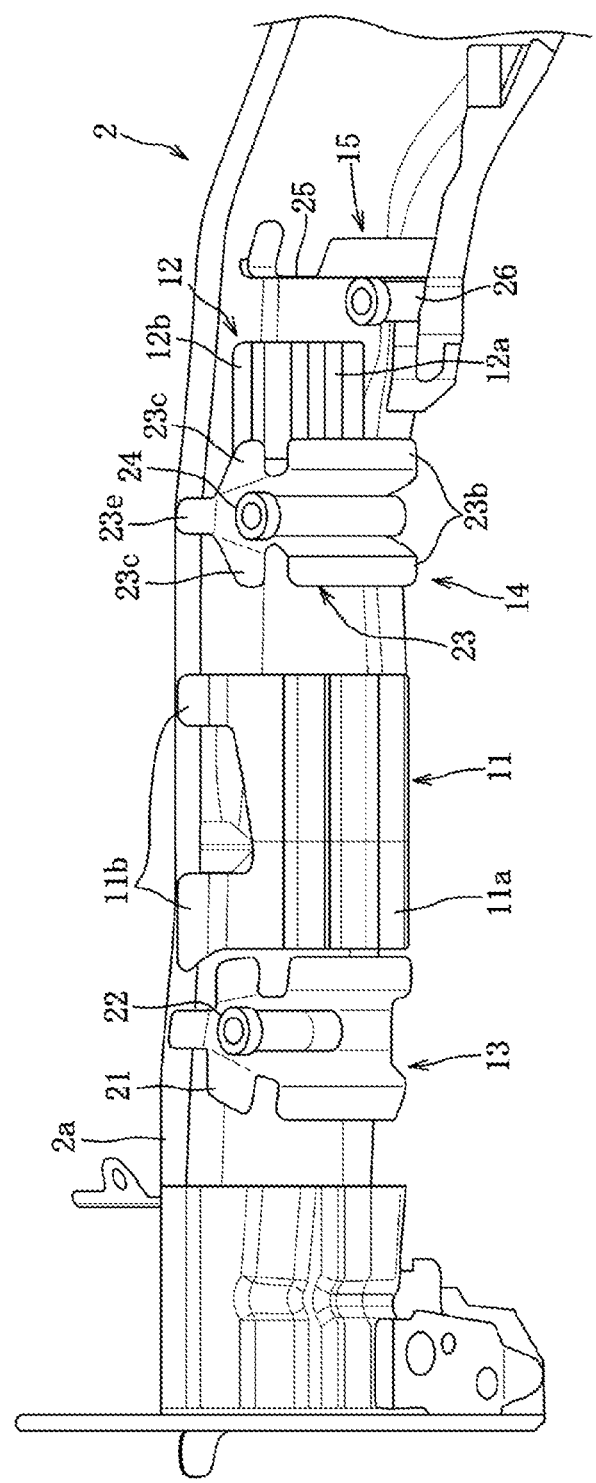
FIG. 3 is a side view of the right-side front side frame, in which an inner panel is removed.
Figure 4:
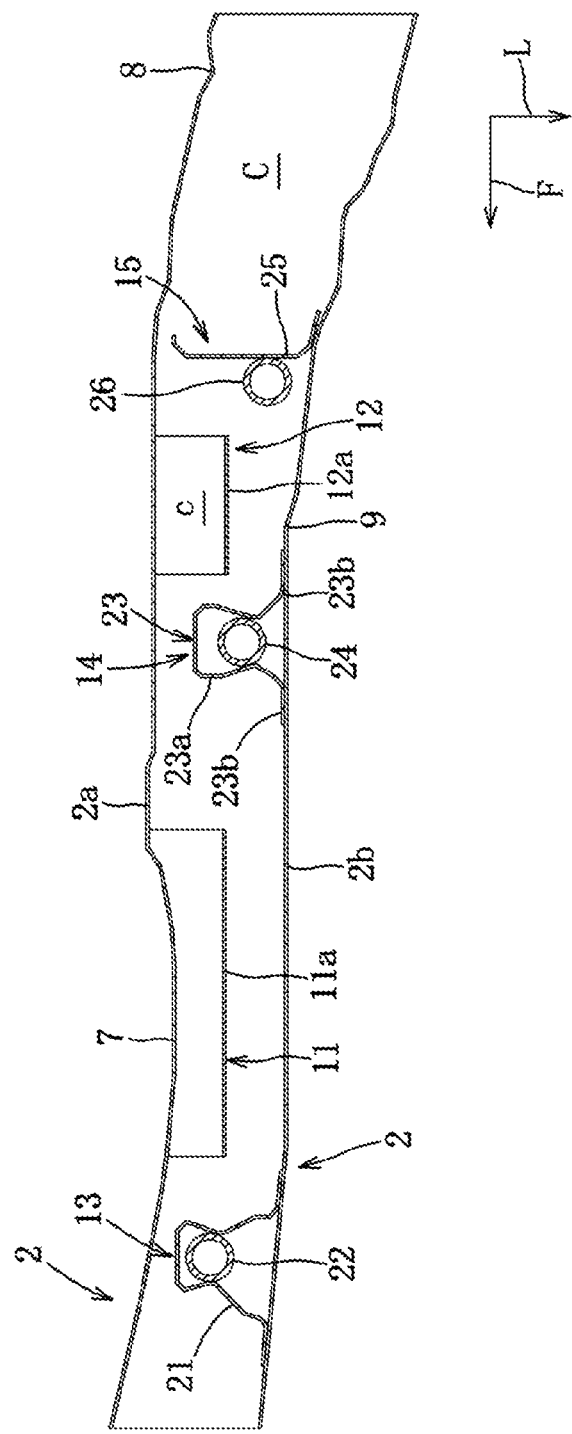
FIG. 4 is a sectional view taken along line IV-IV of FIG. 2.
Figure 5:
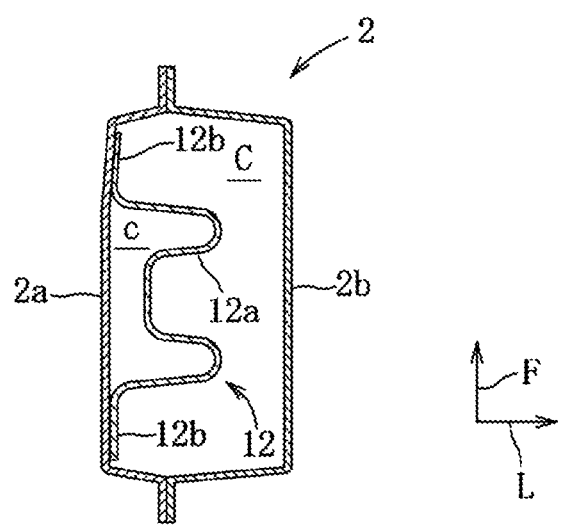
FIG. 5 is a sectional view taken along line V-V of FIG. 2.

As shown in FIGS. 3-5, the front side frame 2 comprises an outer panel 2a and an inner panel 2b which are made of a high-tensile steel plate through pressing and have a roughly hat shape, respectively, and others. The outer panel 2a and the inner panel 2b are joined together at respective upper-and-lower flange portions thereof, thereby forming a main closed cross section C which is of a roughly-rectangular shape having a vertically longer and extends longitudinally straightly.

The outer panel 2a has a curve portion 7 which is provided at its midway portion to curve leftward (toward the side of the inner panel 2*b*) and a bead portion 8 which is provided at its rear-end portion to be concaved leftward and extend vertically. The curve portion 7 and the bead portion 8 constitute a starting point to cause leftward bending of the outer panel 2*a* when an impact load is applied to the outer panel 2*a* from a forward side. The inner panel 2*b* has a bead portion 9 (bending promotion portion) which is provided to be concaved rightward and extend vertically at a position which is located in front of the curve portion 7 and in front of the bead portion 8. The bead portion 9 constitutes a starting point to cause rightward bending of the inner panel 2*b* when the impact load is applied to the outer panel 2*a* from the forward side.

As shown in FIGS. 3-5, inside the main closed cross section C of the front side frame 2 are provided first and second reinforcements 11, 12 to increase the rigidity of the front side frame 2, first-third attaching members 13-15 to support the various auxiliary devices, and others.

A first reinforcement 11 is arranged so as to overlap the curve portion 7 laterally, and comprises a body portion 11*a* which has a roughly W-shaped cross section and a pair of flange portions 11*b* which extend from vertically-both end portions of the body portion 11*a*. Accordingly, the curve portion 7 constitutes a starting point to cause bending of the first reinforcement 11 in the vehicle collision. The body portion 11*a* is joined to the outer panel 2*a* at a right-side wall portion of its middle-stage portion, and joined to the inner panel 2*b* at left-side wall portions of its upper-stage portion and its lower-stage portion. The pair of flange portions 11*b* are interposed between and joined to the upper-and-lower flange portions of the outer panel 2*a* and the upper-and-lower flange portions of the inner panel 2*b*, thereby forming three-layer joint portions. Accordingly, the first reinforcement 11 cooperates with the outer panel 2*a* to form a pair of upper-and-lower closed cross sections extending longitudinally and cooperates with the inner panel 2*b* to form a closed cross section extending longitudinally between the above-described pair of upper-and-lower closed cross sections, thereby forming three closed cross sections inside the main closed cross section C.

Figure 6A:
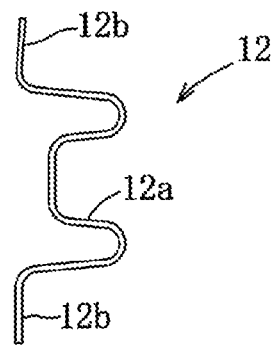
FIGS. 6A, 6B and 6C are a front view, a side view, and a perspective view, when viewed from an obliquely forward side, of a second reinforcement, respectively.
Figure 6B:
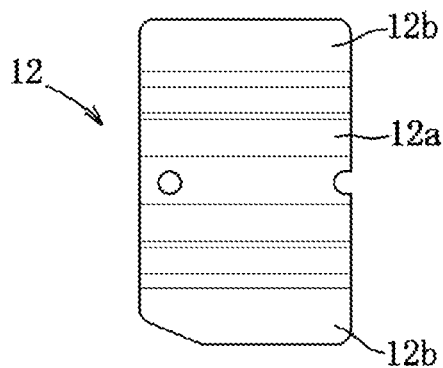
Figure 6C:
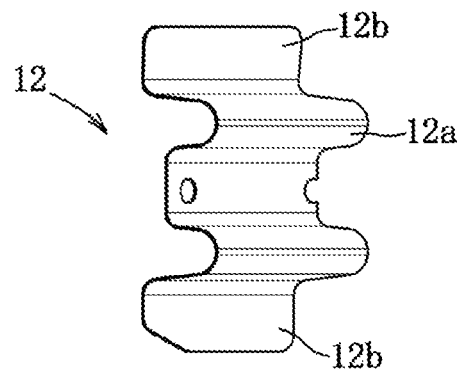

Next, the second reinforcement 12 (reinforcing member) will be descried. As shown in FIGS. 3-5, the second reinforcement 12 is arranged in an area which is located in back of the first reinforcement 11 and laterally faces the bead portion 9. Accordingly, the bead portion 9 constitutes a starting point to cause bending of the second reinforcement 12 in the vehicle collision. As shown in FIGS. 6A-6C, the second reinforcement 12 comprises a body portion 12*a* which has a roughly W-shaped cross section and a pair of flange portions 12*b* which extend from upper-and-lower both end portions of the body portion 12*a*.

The body portion 12*a* is configured such that a right-side wall portion of its middle-stage portion is slightly spaced apart from the outer panel 2*a* and left-side wall portions of its upper-stage portion and its lower-stage portion are spaced apart from the inner panel 2*b* with a specified distance. The upper flange portion 12*b* is joined, by welding, to a portion of the outer panel 2*a* which is located below the upper flange portion, and the lower flange portion 12*b* is joined, by welding, to a portion of the outer panel 2*a* which is located above the lower flange portion. Accordingly, the second reinforcement 12 cooperates with the outer panel 2*a* to form a sub closed cross section c which has a roughly U-shaped cross section extending longitudinally at a position which faces the bead portion 9 inside the main closed cross section C.

Next, the first and second attaching members 13, 14 will be described. The first attaching member 13 is arranged in front of the first reinforcement 11 in order to support the auxiliary device at the front side frame 2. This first attaching member 13 comprises a knot-shaped member 21 which is joined to the outer panel 2*a* and the inner panel 2*b* and a cylindrical collar 22 which is joined to the knot-shaped member 21. The first attaching member 13 has the same structure as the second attaching member 14, except an arrangement position and a supported object.

As shown in FIGS. 3 and 4, since the second attaching member 14 (crushing mechanism) elastically supports a power unit (not illustrated) with the engine mount device, it is arranged at a position which is located in back of the first reinforcement 11 and in front of the second reinforcement 12. This second attaching member 14 comprises a knot-shaped member 23 which is joined to the outer panel 2*a* and the inner panel 2*b* and a cylindrical collar 24 which is joined to the knot-shaped member 23.

Figure 7A:
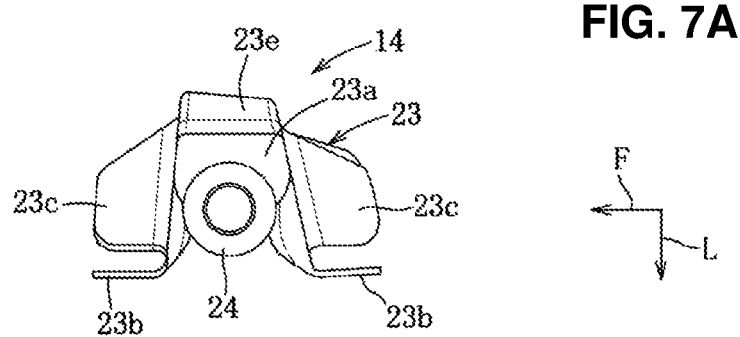
FIGS. 7A, 7B and 7C are a plan view, a perspective view, when viewed from an obliquely upward side, and a perspective view, when viewed from an obliquely downward side, of a second attaching member, respectively.
Figure 7B:
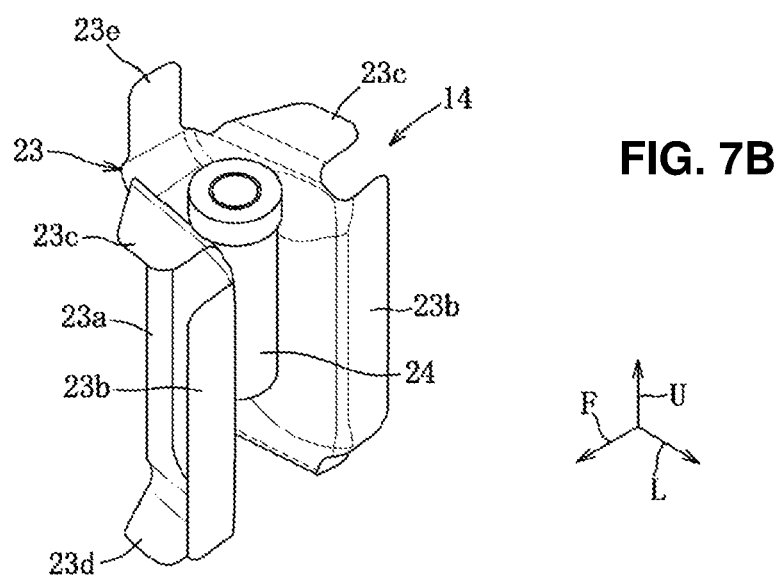
Figure 7C:
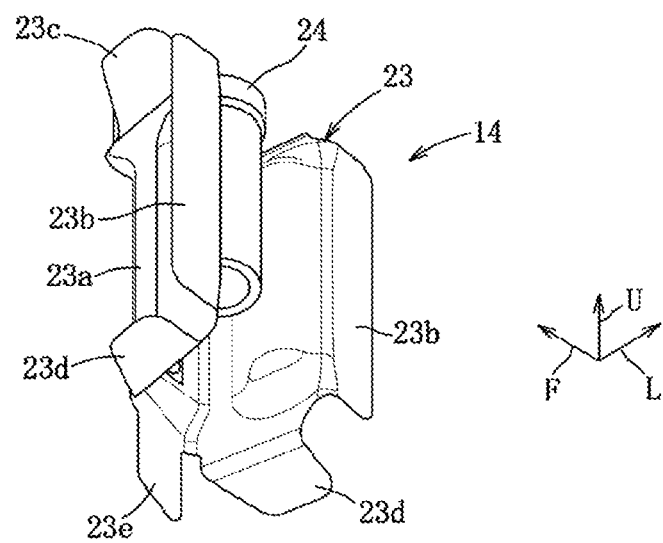

As shown in FIGS. 7A-7C, the knot-shaped member 23 comprises a body portion 23*a* which has a roughly U-shaped cross section opening leftward, a pair of front-and-rear first flange portions 23*b* which respectively extend forward and rearward from front and rear ends of the body portion 23*a* in a perpendicular shape, a pair of front-and-rear second flange portions 23*c* which respectively extend forward and rearward from upper-side front and rear ends of the body portion 23*a* in a horizontal shape, a pair of front-and-rear third flange portions 23*d* which respectively extend forward and rearward from lower-side front and rear ends of the body portion 23*a* in the horizontal shape, and a pair of front-and-rear fourth flange portions 23*e* which respectively extend upward and downward from the front and rear ends of the body portion 23*a* in the perpendicular shape.

As shown in FIG. 4, the body portion 23*a* is configured to enclose a front-side, a rear-side, and a right side of the collar 24. A right end portion of the body portion 23*a* is arranged more closely to the outer panel 2*a* than a central point, in the lateral direction, of the second reinforcement 12. The pair of first flange portions 23*b* are joined to a side wall portion of the inner panel 2*b*, and the rear-side first flange portion 23*b* is fixed to a position located in front of the bead portion 9. The pair of second flange portions 23*c* are joined to an upper wall portion of the inner panel 2*b*, and the pair of third flange portion 23*d* are joined to a lower wall portion of the inner panel 2*b*. The pair of fourth flange portions 23*e* are interposed between and joined to the respective upper and lower flange portions of the outer panel 2*a* and the inner panel 2*b*, thereby forming three-layer joint portions.

Figure 8:
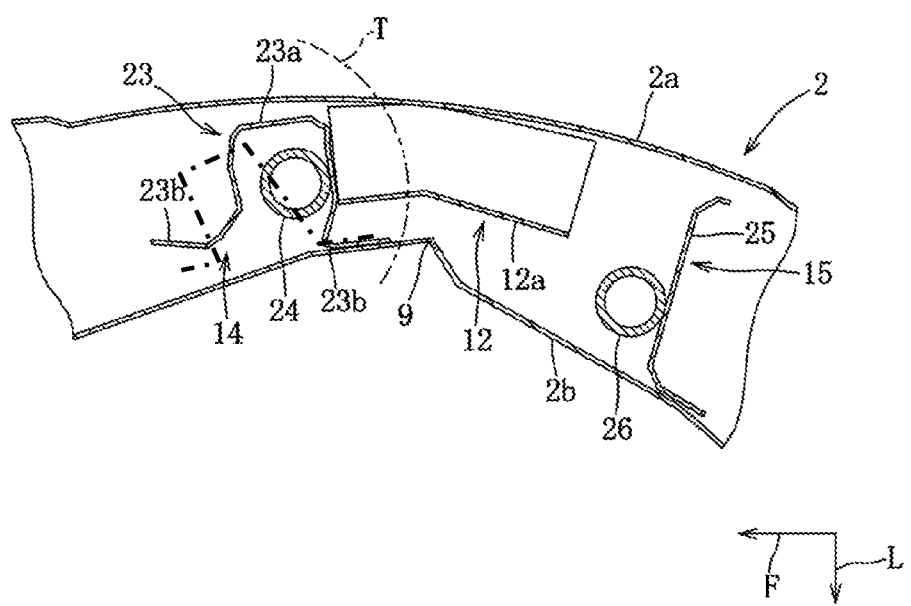
FIG. 8 is a diagram explaining motions of the second reinforcement and the second attaching member after a vehicle collision.

In the above-described structure, as shown in FIG. 8, when the impact load is applied from the forward side, the body portion 23*a* moves in the bending direction of the second reinforcement 12 in accordance with the inner panel 2*b* having rightward bending deformation, so that the body portion 23*a* moves on a roughly arc-shaped locus T. After a rear-end wall portion of the body portion 23*a* contacts a front end portion of the second reinforcement 12, pressing of the body portion 23*a*, including the collar 24, against the second reinforcement 12 starts, so that the second reinforcement 12 is crushed. Thus, the second reinforcement 12 has its compressive deformation through crushing substantially synchronously with its bending deformation.

Next, the third attaching member 15 will be described. This third attaching member 15 is arranged in back of the second reinforcement 12 so as to support the suspension sub frame at the front side frame 2. The third attaching member 15 comprises a knot-shaped member 25 which is joined to the outer panel 2a and the inner panel 2b and a cylindrical nut 26 which is joined to the knot-shaped member 25. As shown in FIGS. 3 and 4, the knot-shaped member 25 is provided to longitudinally partition the main closed cross section C, and its upper, lower, right, and left flange portions are welded to the outer panel 2a and the inner panel 2b. The nut 26 is arranged in front of the knot-shaped member 25 and configured to support the suspension sub frame with a bolt.

Next, the operations/effects of the frame structure for the vehicle of the present embodiment will be described. According to the present frame structure for the vehicle, since there is provided the bead portion 9 which is formed at the portion of the inner panel 2b which is located at the position corresponding to the second reinforcement 12 and configured to be the starting point which causes the bending of the front side frame 2 (the inner panel 2b) toward the second reinforcement 12 when the collision load is applied to the front side frame 2 in the vehicle collision, the second reinforcement 12 can be made to have the bending deformation at the previously-set starting point by the impact load. Further, since there is provided the second attaching member 14 which is provided at the position located on the front-end side of the front side frame 2 relatively to the second reinforcement 12 and configured to make the second reinforcement 12 crushable in the bending direction in the vehicle collision, the impact load can be properly absorbed by using the compressive strength of the second reinforcement 12.

Since the second attaching member 14 comprises the knot-shaped member 23 provided in the main closed-cross section C, the second reinforcement 12 can be crushed in the bending direction by the knot-shaped member 23 which is an existing rigidity member.

Since the knot-shaped member 23 is configured to have the roughly U-shaped cross section, in the plan view, which opens toward the inner panel 2b, and joined to the inner panel 2b at its front and rear ends, the closed cross section is formed in the plan view by the knot-shaped (U-shaped) member 23 and the inner panel 2b. Accordingly, the crushing can be further promoted through the closed cross section's contacting the second reinforcement 12 in the vehicle collision.

Since the knot-shaped member 23 comprises the collar 24 which is provided to extend in the vertical direction inside the roughly U-shaped cross section of the knot-shaped member 23, it can be properly suppressed that the closed cross section is crushed by the collar 24 provided inside during the above-described crushing through the closed cross section's contacting the second reinforcement 12 in the vehicle collision.

The inner panel 2b is configured to have the hat-shaped cross section, in the front view, which comprises a side wall portion, an upper wall portion, a lower wall portion, and a pair of upper-and-lower flange portions extending vertically from respective side ends of the upper and lower wall portions and joined to a pair of upper-and-lower flange portions formed at the outer panel at the pair of upper-and-lower flange portions thereof, respectively, and the knot-shaped member 23 of the second attaching member 14 is joined to the side wall portion, the upper wall portion, and the lower wall portion of the inner panel 2b and comprises a pair of upper-and-lower flange portions 23e which are provided to extend upward and downward from upper and lower ends thereof, which are interposed between and joined to the respective upper-and-lower flange portions of the outer and inner panels 2a, 2b, thereby forming three-layer joint portions at each of the respective pair of upper-and-lower flange portions of the outer panel 2a, the inner panel 2b, and the knot-shaped member 23. Accordingly, it can be properly suppressed that the outer panel 2a is deformed forward relatively to the inner panel 2b (shown by an imaginary line in FIG. 8) because the second attaching member 14 is not strong enough compared to the yield strength, in a crushing direction, of the second reinforcement 12 when the crushing of the second reinforcement 12 progresses through the second attaching member 14's contacting the second reinforcement 12 in the vehicle collision.

Since the second attaching member 14 is joined to the inner panel 2b, the second attaching member 14 can be deformed in the bending direction by using deformation of the inner panel 2.

Since the second reinforcement 12 is spaced apart from the inner panel 2b, previously-set bending deformation can be started for the inner panel 2b by the impact load, so that the second reinforcement 12 can be made to have bending deformation with time lags.

Since the second attaching member 14 comprises the collar 24, the second reinforcement 12 can be surely crushed in the bending direction by the collar 24 which is the existing rigidity member.

Next, modifications where the above-described embodiment is modified partially will be described.

1] While the above-described embodiment described an example of the front side frame, the present invention is applicable to any type of frame for the vehicle, such as a rear side frame, a suspension cross member, a bumper beam, a center pillar, or an impact bar, as long as at least a compressive load and a tensile load are applied to the frame.

2] While the above-described embodiment described an example where the single reinforcement and the single attaching member as the crushing mechanism are provided, plural pairs of the reinforcement and the crushing mechanism provided on the front-end side (an impact-load input side) of the frame relatively to the reinforcement may be provided inside the frame. Further, it is unnecessary that the crushing mechanism comprises the knot-shaped member and the collar, and any type of member, such as a collar, a nut, or bolt, is usable as long as it is movable in the deformation direction due to the bending of the reinforcement by the impact load and pressing crushable.

3] The present invention should not be limited to the above-described embodiment and any other modifications or improvements may be applied within the scope of a spirit of the present invention.

What is claimed is:

1. A frame structure for a vehicle, comprising:
an outer panel forming an outward wall portion, in a vehicle width direction, of a frame;
an inner panel forming an inward wall portion, in the vehicle width direction, of the frame and cooperating with the outer panel to form a main closed-cross section extending in a longitudinal direction;
a reinforcing member provided in the main closed-cross section, wherein the reinforcing member is joined only to one of the outer panel and the inner panel and spaced apart from the other one of the outer panel and the inner panel such that the reinforcing member cooperates with said one of the outer panel and the inner panel to form a sub closed-cross section extending in the longitudinal direction;
a bending promotion portion formed at a portion of said other one of the outer panel and the inner panel which is located at a position corresponding to the reinforcing member, the bending promotion portion being configured to be a starting point which causes bending of the frame toward the reinforcing member when a collision load is applied to the frame in a vehicle collision; and a crushing mechanism provided at a position which is located on a front-end side of the frame relatively to the reinforcing member and right before the reinforcing member and configured to make the reinforcing member crushable in a bending direction in the vehicle collision.

2. The frame structure for the vehicle of claim 1, wherein said crushing mechanism comprises a knot-shaped member provided in said main closed-cross section.

3. The frame structure for the vehicle of claim 1, wherein said crushing mechanism is joined to said other one of the outer panel and the inner panel.

4. The frame structure for the vehicle of claim 2, wherein said knot-shaped member is configured to have a roughly U-shaped cross section, in a plan view, which opens toward the said other one of the outer panel and the inner panel, and joined to said other one of the outer panel and the inner panel at front and rear ends thereof.

5. The frame structure for the vehicle of claim 2, wherein said inner panel is configured to have a hat-shaped cross section, in a front view, which comprises a side wall portion, an upper wall portion, a lower wall portion, and a pair of upper-and-lower flange portions extending vertically from respective side ends of the upper and lower wall portions and joined to a pair of upper-and-lower flange portions formed at said outer panel at the pair of upper-and-lower flange portions thereof, respectively, and said knot-shaped member of the crushing mechanism is joined to the side wall portion, the upper wall portion, and the lower wall portion of said inner panel and comprises a pair of upper-and-lower flange portions which are provided to extend upward and downward from upper and lower ends thereof, which are interposed between and joined to the respective upper-and-lower flange portions of said outer and inner panels, thereby forming three-layer joint portions at each of the respective pair of upper-and-lower flange portions of the outer panel, the inner panel, and the knot-shaped member.

* * * * *